(12) United States Patent
Ribbe et al.

(10) Patent No.: US 11,045,063 B2
(45) Date of Patent: Jun. 29, 2021

(54) SUPER ABSORBENT AND DISPENSING MOP

(71) Applicant: Geerpres, Inc., Muskegon, MI (US)

(72) Inventors: Scott E. Ribbe, West Olive, MI (US); David R. Harry, Oak Ridge, NC (US)

(73) Assignee: Geerpres, Inc., Muskegon, WI (US)

( * ) Notice: Subject to any disclaimer, the term of this patent is extended or adjusted under 35 U.S.C. 154(b) by 160 days.

(21) Appl. No.: 15/964,034

(22) Filed: Apr. 26, 2018

(65) Prior Publication Data

US 2019/0246865 A1    Aug. 15, 2019

Related U.S. Application Data

(60) Provisional application No. 62/629,271, filed on Feb. 12, 2018.

(51) Int. Cl.
*A47L 13/24* (2006.01)
*B32B 7/08* (2019.01)
*A47L 13/257* (2006.01)
*A47L 13/256* (2006.01)
*A47L 13/22* (2006.01)
*F16B 45/00* (2006.01)
*F16B 47/00* (2006.01)

(52) U.S. Cl.
CPC .............. *A47L 13/24* (2013.01); *A47L 13/256* (2013.01); *A47L 13/257* (2013.01); *B32B 7/08* (2013.01); *A47L 13/22* (2013.01); *B32B 2250/40* (2013.01); *B32B 2307/726* (2013.01); *B32B 2432/00* (2013.01); *F16B 45/00* (2013.01); *F16B 47/003* (2013.01)

(58) Field of Classification Search
CPC ........ A47L 13/16; A47L 13/24; A47L 13/256; A47L 13/257; B32B 2432/00; B32B 2432/03; B32B 2432/04; B32B 2250/03; B32B 2250/04; B32B 7/08
USPC .......................... 15/208, 228; 442/2, 10, 32
See application file for complete search history.

(56) References Cited

U.S. PATENT DOCUMENTS

| | | | | |
|---|---|---|---|---|
| 3,709,764 | A * | 1/1973 | Thomas | A47L 13/16 156/177 |
| 5,217,787 | A * | 6/1993 | Monahan | A47L 13/20 428/134 |
| 5,814,388 | A * | 9/1998 | Fryan | B32B 7/08 428/95 |
| 6,537,403 | B1 * | 3/2003 | Blenke | B06B 3/00 156/73.1 |
| 8,060,973 | B2 * | 11/2011 | Wildeman | A47L 13/20 15/209.1 |
| 8,809,213 | B2 * | 8/2014 | Wildeman | A01N 25/34 442/351 |
| 2003/0045197 | A1 * | 3/2003 | Kakiuchi | C11D 17/049 442/403 |

* cited by examiner

*Primary Examiner* — Laura C Guidotti
(74) *Attorney, Agent, or Firm* — Mitchell Intellectual Property Law, PLLC

(57) ABSTRACT

A multi-layer pad mop having an unsealed edge, such that an absorbing and dispensing pathway extends from the interior of the mop to its perimeter edge.

6 Claims, 4 Drawing Sheets ed by common cleaners and disinfectants, especially germicidal cleaners. In this embodiment, the edges 1a are unsealed (FIGS. 6 and 7).

SUPER ABSORBENT AND DISPENSING MOP

CROSS REFERENCE TO RELATED APPLICATION

This application claims priority to U.S. Provisional Application Ser. No. 62/629,271, filed Feb. 12, 2018, entitled SUPER ABSORBENT MOP.

FIELD OF THE INVENTION

The present invention relates to the field of multi-layer pad type mops. The mop is an absorbent pad which when in use, is secured to a cleaning tool comprising a mop retaining plate which in turn is secured, usually pivotally, to the end of an elongated handle.

BACKGROUND

Multi-layer pad type mops 1 are sealed at their edges 1a to provide the mop with a trim appearance and help prevent the layers of the mop from separating (FIG. 1). The end edges 1b are typically heat sealed, since the individual mops are typically cut to length by a heated wire or blade, from an elongated band of laminated layers. The longitudinal side edges of the mop may be heat sealed as shown in FIG. 2, stitch bonded as shown in FIG. 3, serged as shown in FIG. 4, or wrap bonded as shown in FIG. 5.

Heat bonding is achieved by heated blade or wire trimming, or by compressing the longitudinal edge portion 2 of the pad with in a heated press, usually for a distance of ⅛ to ⅜ inch from the perimeter (FIG. 2). In stitch bonding, the longitudinal perimeter edge is compressed together by several rows of stitching 3 which run parallel to the edge of the multi-layer mop (FIG. 3). The rows of stitches seal the edge typically for a distance of ⅛ to ⅜ inch from the perimeter (FIG. 3). In serging, thread is sewn through the layers usually at a distance of ⅛ to ⅜ inch from the perimeter, and then wrapped around the perimeter edge in a sequentially repeating manner such that the entire edge is wrapped in serging thread (FIG. 4). In wrap binding, a relatively thin bottom layer 5 is wrapped up and over the edge of an upper layer or layers as at 5a, for a distance of typically ⅛ to ⅜ inch, where it is sewn by a line of thread 5b passing through the layers from top to bottom in a row parallel to and close to the top edge of the wrapped layer.

SUMMARY OF THE INVENTION

In the present invention, we have surprisingly discovered that the cleaning solution absorbed and dispensed by a multi-layer pad type mop can be significantly enhanced by providing the pad with an unsealed edge, such that an absorbing and dispensing pathway extends from the interior of the mop to its perimeter edge. At least one layer of the mop is made of a soft fluffy absorbent material. Preferably, the layers are made of fibrous material which will not significantly interact with and degrade germicidal compounds, such as quaternary ammonium, chlorine containing compounds, and peracetic/peroxygen compounds allowing the mop to be used with germicidal cleaners.

DESCRIPTION OF THE PREFERRED EMBODIMENTS

Figure 1:
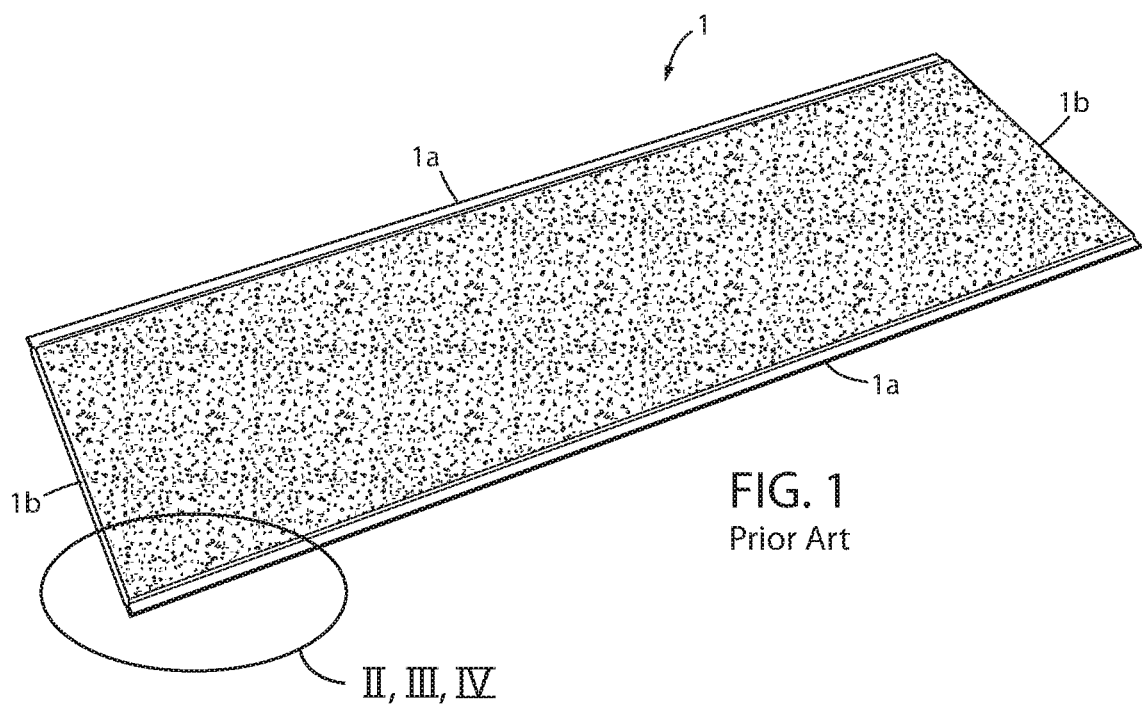
FIG. 1 is a prior art pad type mop with sealed edges.
Figure 2:
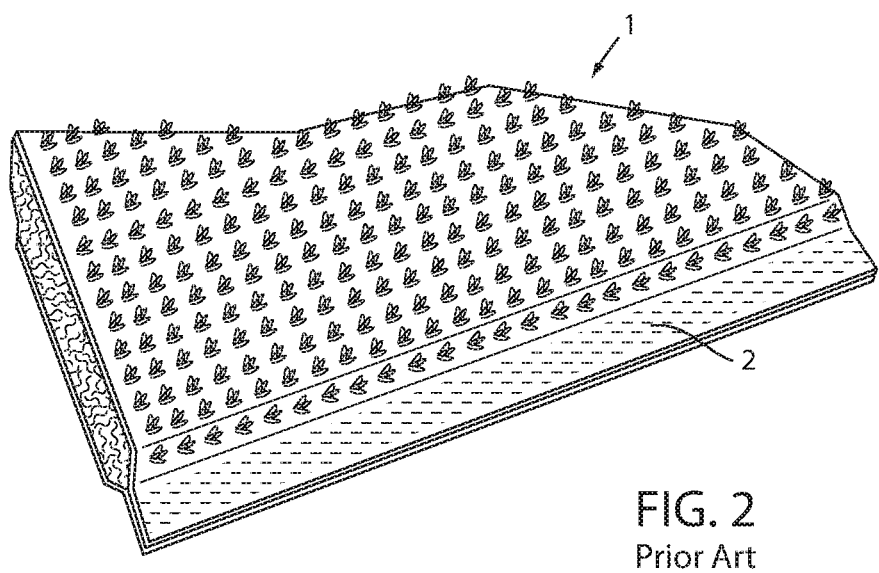
FIG. 2 is a close-up perspective of the heat-sealed edge of a prior art multi-layer mop.

FIGS. 6-11 depict several alternative preferred embodiments of the present invention. In describing these embodiments, we refer to the top surface and bottom surface of the pads as they are depicted in the drawings. However, in use, the pads would be inverted. The bottom surface as shown in the drawings would be the top surface of the pad as used, and would thus be the surface which is mated with and attached to the mounting plate of the handle and mounting plate assembly. The top surface as shown would be the floor engaging surface of the pads in use.

Figure 6:
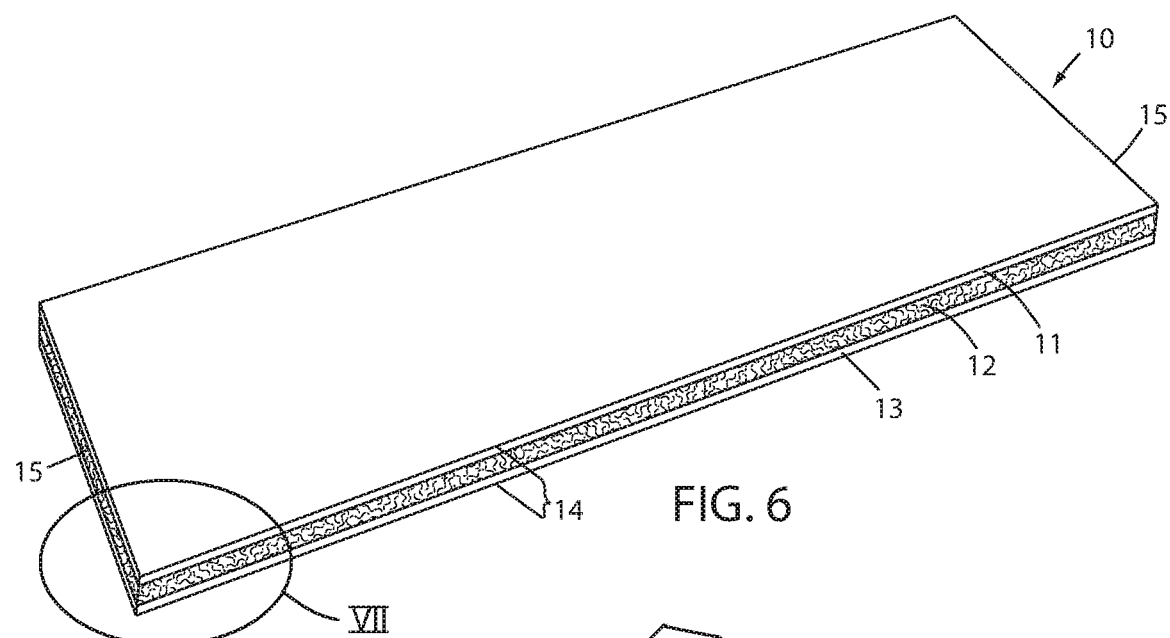
FIG. 6 is a perspective view of a multi-layer mop having an unsealed edge.

FIG. 6 shows a three-layer mop 10. The floor engaging layer 11 is preferably designed to apply cleaning solution and capture dirt, debris, pathogenic material and/or bioburden. Thus, it preferably is soft and absorptive. However, a porous thin scrim which is somewhat abrasive, yet porous enough to allow cleaning solution to pass through either way, may be useful.

The center layer 12 is preferably a soft fluffy absorptive fleece. Other types of absorptive layers which have been used in multilayer mops or wipes include layers of artificial or natural sponge, knit fabric layers, non-woven fleece layers, cloth fleece layers, cotton, cellulosic and other natural fibers.

The bottom layer 13 is designed to attach readily to the mop retainer plate of the cleaning tool. Since such retainer plates often incorporate hook type fasteners, the bottom layer may be soft or porous enough to permit hook penetration. It may include exposed stitching to give the hooks stitches to grab. It may include loops for engagement by the hooks. It may comprise a layer of looped fabric for engagement by the hooks. A layer coated with a temporary adhesive might also be used, facilitating attachment to the face of a mop retainer plate.

Preferably, mop 10 has a top layer 11 of relatively thin, porous scrim, a thicker absorbent layer 12, and a bottom layer of scrim 13. All three layers are preferably made of fibers which do not significantly interact with and degrade germicidal compositions such as those containing quaternary ammonium compounds and chlorine containing compounds, and peracetic/per oxygen compounds allowing the mop to maintain approved germicidal use concentrations. Polymeric fibers are preferred. Cellulose fibers may be used in some embodiments, but not in mops for use with germicidal cleaning compositions. Thus, for non-germicidal applications the absorptive layer or layers could be cellulosic, a layer of absorptive sponge, or other absorptive material.

The intermediate layer may be a fluffy, fleece like polypropylene or polyester fibrous absorptive layer having a thickness of from about 0.10 to about 0.25 inches. The interstices of fibrous polypropylene or polyester can both be absorptive. Preferred is a nonwoven polyester fleece at a density of 185 grams per square meter works well as an absorptive layer. Each of the porous scrim layers 12 and 13 are extremely thin, e.g. about 0.010 inches or less, and made of spun bonded polyester or polypropylene. They comprise a melt blown spun-bond non-woven polypropylene or polyester material.

The various layers of the multi-layer pads may be adhered together in various ways. Heat rolled adherence is preferred, since it avoids the addition of any adhesive material which might interfere with the porosity of the scrims or the fluffier absorbent layer.

In mop 10, the longitudinal edges 14 of the pad are unsealed. This leaves an open pathway from the longitudinal side edges into the interior of mop 10. Since the pads are made of an elongated ribbon of multi-layer material cut into segments which may vary from 6" to 30" in length, more typically 16" to 18" lengths, the ends 15 of pad 6 will typically be heat sealed due to the heated cutting blade, heated wire, or laser, which are typically used.

Top scrim 11 is preferably sufficiently porous to facilitate the passage of cleaning solutions into and out of the thicker fluffy absorbent layer 12. It may also be of an absorbent fibrous material itself, such as a polyester or polypropylene fiber. Bottom scrim 13 is also preferably sufficiently porous to provide openings which facilitate hook and loop mounting of pad 10 to the mop, where the mop mounting plate includes a plurality of hooks for such hooking attachment.

Figure 7:
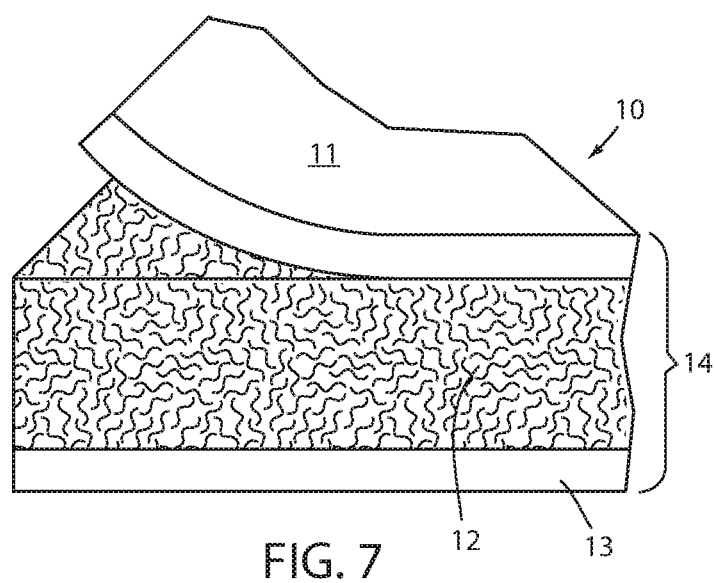
FIG. 7 is a perspective view of a portion of a multi-layer mop with an unsealed edge, showing a portion of the upper layer being peeled away to illustrate the absence of edge sealing.

FIG. 7 shows a corner of pad 10 with top layer 11 peeled away from intermediate absorbent layer 12 at the corner, to demonstrate the absence of any seal along the longitudinal edge 14 of mop 10.

Figure 8:
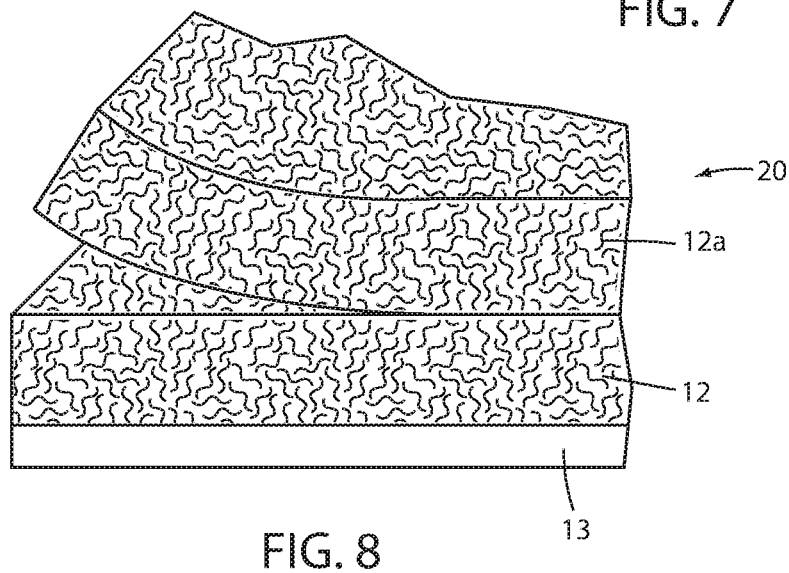
FIG. 8 is a similar view for a mop comprises two relatively thick absorbent layers and a thinner bottom layer.

FIG. 8 shows the corner of an alternative embodiment pad 20 made of a bottom scrim 13, a fluffy fleece absorbent intermediate layer 12, and a similar fluffy fleece absorbent top layer 12a. As in FIG. 7, top layer 12a is peeled away from intermediate layer 12 to illustrate the absence of a seal along the longitudinal edge 14 thereof.

Figure 9:
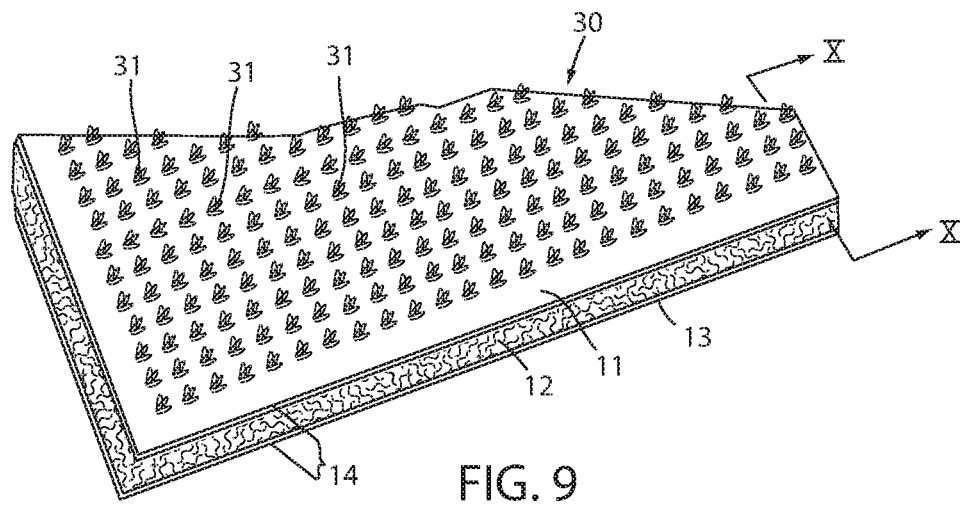
FIG. 9 is a perspective view of a portion of a multi-layer pad type mop which includes a plurality of stitched loops throughout the face of the mop, but spaced inwardly slightly from at least the longitudinal perimeter side edges.
Figure 10:
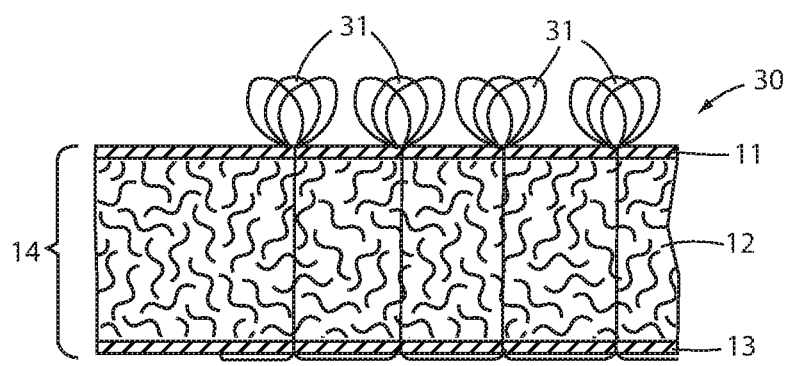
FIG. 10 is a cross sectional view of the edge portion of the mop of FIG. 9, demonstrating the manner in which such stitched loops are formed and spaced slightly inwardly from the longitudinal side edge.

FIGS. 9 and 10 show an alternative embodiment pad 30 comprised of a top scrim 11, an intermediate fluffy fleece absorbent layer 12 and a bottom scrim layer 13, such as those used in preferred embodiment mop 10. The difference is that mop 30 includes a plurality of projecting loops 31 which are stitched into pad 30, and project from the cleaning face of the mop. Such stitched loops are often referred to in the industry as "stitch bonded loops." However, that terminology is incorrect, because the loops do not place any binding compression on the assembled layers of the mop. While they may tend to compress the assembly to a degree, they do not form a sufficient seal against absorption and delivery of cleaning fluid, unless one pulls the thread sufficiently tight to eliminate the loops and create compression in the laminate.

Preferably, the stitched loops (preferably the edge of the scrim layer also) are kept a short distance (about 1/16 to about 3/8 of an inch) from the longitudinal side edges 14 of the mop. This allows the absorptive fluffy fleece layer to expand slightly beyond the edge of the loops (and scrim), enhancing the absorptive and dispensing character of the mop even further.

The stitched fibers of loops 31 are typically very fine, ranging from microfibers having a diameter of 10 micrometers or less, and a denier of about 1 or less per fiber, to fibers having a denier of about 5. Thicker fibers having higher denier may also find use in some circumstances. For example, it is obvious that thicker larger loops tend to capture larger articles or hair better than shorter microfiber loops, which obviously are better suited to capture dirt, debris, pathogenic material and/or bioburden particles more effectively.

Figure 11:
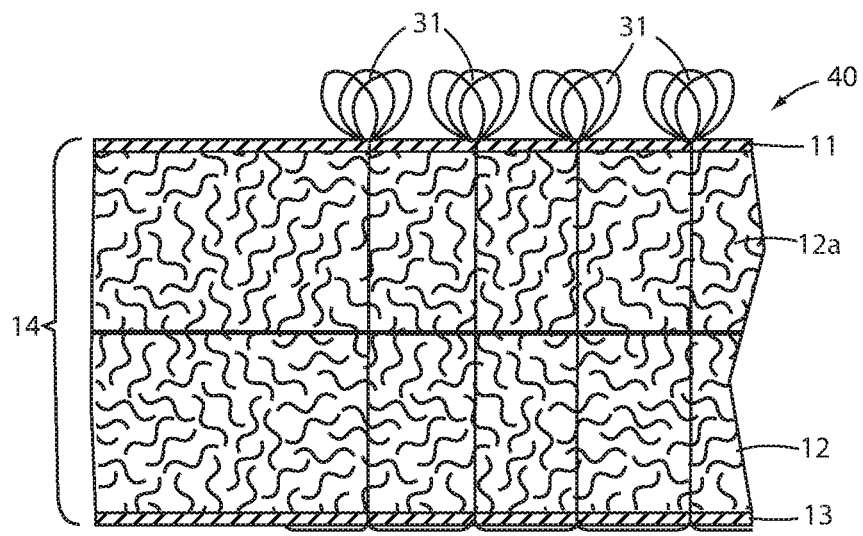
FIG. 11 is a similar cross-sectional view of the edge portion of an alternative preferred embodiment mop having a bottom scrim layer, two absorbent layers, and a top porous scrim layer, and stitched surface loops.

FIG. 11 shows an alternative embodiment pad style mop 40 comprised of four layers: a bottom scrim 13 for attachment to a mop retainer plate, an intermediate absorbent layer 12, another intermediate absorbent layer 12a, and a top scrim layer 11. Mop 40 also includes stitched loops 31 like those used in mop 30.

EXPERIMENTAL RESULTS

Experiment 1

Figure 3:
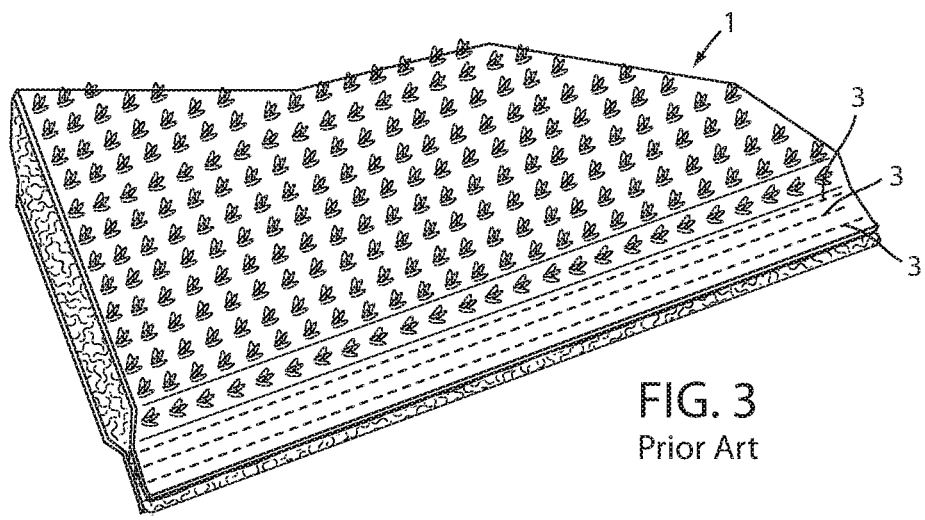
FIG. 3 is a close-up perspective of a stitch bonded edge of a prior art multi-layer mop.
Figure 4:
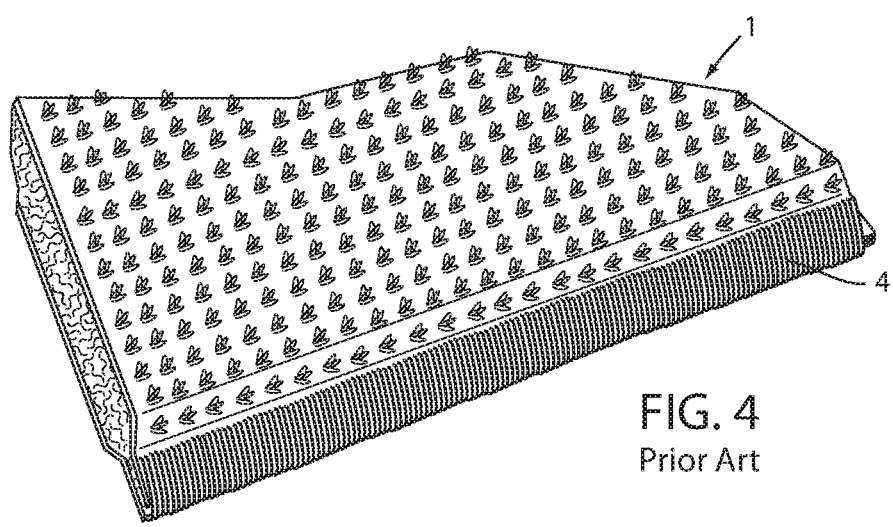
FIG. 4 is a close-up perspective view of a serged edge prior art multi-layer mop.
Figure 5:
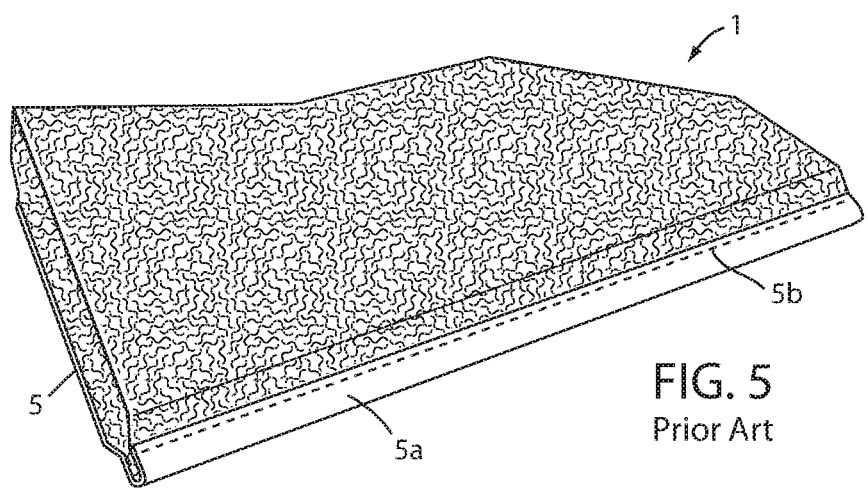
FIG. 5 is a close-up perspective view of a wrap bonded edge of a prior art multi-layer mop.

In the experiments reported in Table 1, mops designed in accordance with preferred embodiment 30, with polypropylene scrim (Advantex™), were tested against the same mop made with stitch bonded edges, such as is shown in prior art FIG. 3. Three parallel rows of stitch bonding near the mop edge were used to affect the sealing.

Two commercial single use mops (Commercial A and Commercial B) manufactured with sealed edges were also tested against the same commercial mop with the sealed edge cut away to create an open edge in accordance with the present invention. For each type of mop, 5 were tested with open edges and 5 with sealed edges. The longitudinal side edge sealing for these mops was also achieved with several rows of stitch bonding near the side edges of the mop The mops tested are identified in column 1 below. The procedure for each mop was as follows:

1. The mop was weighed dry (column 2).
2. Allowed to soak up cleaning solution.
3. Weighed wet (column 3).
4. The mops were each used to mop the same area of the same floor.
5. The weight of the mop post application was determined (column 4).
6. The difference between the weight before and after application gives the weight of cleaning solution delivered to the cleaning surface (column 6).
7. The remainder is the amount of cleaning solution which remained absorbed. (column 5)
8. The grams of cleaning solution delivered per gram of mop was also recorded. (column 7)

The results obtained are shown in Table 1 below.

TABLE 1

| Mops | Dry | Wet | Post application | Absorbed | Delivery | solution/ 1 g mop |
|---|---|---|---|---|---|---|
| Advantex | | | | | | |
| Advantex open edge 1 | 17.91 | 178.52 | 30.58 | 12.67 | 147.94 | |
| Advantex open edge 2 | 17.71 | 180.23 | 38.23 | 20.52 | 142 | |
| Advantex open edge 3 | 18.41 | 179.69 | 25.75 | 7.34 | 153.94 | |
| Advantex open edge 4 | 17.7 | 180.54 | 35.34 | 17.64 | 145.2 | |
| Advantex open edge 5 | 17.49 | 178.91 | 36.33 | 18.84 | 142.58 | 20.60% |
| Advantex open edge Avg | 17.8 | 179.6 | 33.2 | 15.4 | 146.3 | 8.2 |
| Advantex sealed edge 1 | 18.59 | 164.21 | 39.13 | 20.54 | 125.08 | |
| Advantex sealed edge 2 | 18.69 | 167.5 | 44.47 | 25.78 | 123.03 | |
| Advantex sealed edge 3 | 18.1 | 166.55 | 43.5 | 25.4 | 123.05 | |
| Advantex sealed edge 4 | 18.27 | 166.95 | 42.69 | 24.42 | 124.26 | |
| Advantex sealed edge 5 | 18.4 | 167.82 | 41.16 | 22.76 | 126.66 | |
| Advantex sealed edge Avg | 18.4 | 166.6 | 42.2 | 23.8 | 124.4 | 6.8 |
| Commercial A | | | | | | |
| Com. A open edge 1 | 21.11 | 210.55 | 70.09 | 48.98 | 140.46 | |
| Com. A open edge 2 | 21.99 | 207.85 | 70.78 | 48.79 | 137.07 | |
| Com. A open edge 3 | 21.68 | 208.69 | 69.08 | 47.4 | 139.61 | |
| Com. A open edge 4 | 21.16 | 207.6 | 64.98 | 43.82 | 142.62 | |
| Com. A open edge 5 | 21.09 | 203.71 | 65.13 | 44.04 | 138.58 | 18% |
| Com. A open edge Avg | 21.4 | 207.7 | 68.0 | 46.6 | 139.7 | 6.5 |
| Com. A sealed edge 1 | 23.76 | 205.36 | 73.73 | 49.97 | 131.63 | |
| Com. A sealed edge 2 | 23.99 | 201.97 | 71.2 | 47.21 | 130.77 | |
| Com. A sealed edge 3 | 23.51 | 207.14 | 74.79 | 51.28 | 132.35 | |
| Com. A sealed edge 4 | 23.89 | 208.63 | 77.18 | 53.29 | 131.45 | |
| Com. A sealed edge 5 | 23.42 | 200 | 68.21 | 44.79 | 131.79 | |
| Com. A sealed edge Avg | 23.7 | 204.6 | 73.0 | 49.3 | 131.6 | 5.5 |
| Commercial B | | | | | | |
| Com. B open edge 1 | 21.33 | 216.17 | 75.41 | 54.08 | 140.76 | |
| Com. B open edge 2 | 21.08 | 218.98 | 76.99 | 55.91 | 141.99 | |
| Com. B open edge 3 | 21 | 212.8 | 73.92 | 52.92 | 138.88 | |
| Com. B open edge 4 | 20.92 | 214.36 | 73.67 | 52.75 | 140.69 | |
| Com. B open edge 5 | 21.48 | 215.72 | 74.64 | 53.16 | 141.08 | 20.00% |
| Com. B open edge Avg. | 21.2 | 215.6 | 74.9 | 53.8 | 140.7 | 6.6 |
| Com. B sealed edge 1 | 23 | 201.92 | 73.79 | 50.79 | 128.13 | |
| Com. B sealed edge 2 | 23.39 | 198.39 | 73.44 | 50.05 | 124.95 | |
| Com. B sealed edge 3 | 23.16 | 202.95 | 70.89 | 47.73 | 132.06 | |
| Com. B sealed edge 4 | 23.44 | 200.67 | 72.54 | 49.1 | 128.13 | |
| Com. B sealed edge 5 | 23.28 | 199.99 | 68.15 | 44.87 | 131.84 | |
| Com. B sealed edge Avg | 23.3 | 200.8 | 71.8 | 48.5 | 129.0 | 5.5 |

Our tests showed that in each case, the amount of cleaning solution absorbed by the open edge versions of each mop was greater than that absorbed by the sealed edge versions. The amount of cleaning solution delivered by the open edge versions was 18-20% more than for their sealed edge counterparts.

Experiment 2

In a second set of experiments, a University Textile Lab tested the Advantex™ Mop made per FIG. 6 against a sewn bonded edge version made per FIG. 3. Five additional single use commercial mops manufactured with sealed edges, were also evaluated with the same mop with the sealed edge removed to create an open edge in accordance with the present invention. The same procedure as followed as set forth above in Experiment 1, except that a mechanical Mathis HVF textile padder applicator was used with set speed and pressure to provide uniform pressure to squeeze the solution to provide improved objective measurements as a result of eliminating the physical variables of the original testing that physically applied solution to the floor. The textile padder provides improved scientific physical measurements.

Each value in the table is the average of a set of five units of the cited mop. Column 1 identifies the mops tested. Column 2 reports the dry weight of each mop, column 3 the weight, column 4 the post application weight, column 5 the weight of solution delivered, column 6 the grams of cleaning solution delivered per gram of mop, and column 7 provides a summary of the layer construction of each mop. In the layer construction summary, "Syn" is "synthetic," "NW" is "non-woven," "assy" is "assembly," and "w/" is "with." The statement, "Syn NW scrim w/stitched syn loops," refers to a layer of synthetic non-woven scrim having synthetic fiber loops stitched only through that layer. The statement, "assy-stitched loops, stitch bonded edges," indicates that the loops were stitched through the entire laminated assembly, rather than merely through one layer, and that the means of sealing the edge was through several layers of stitch bonding, or through edge serging.

TABLE 2

UNIVERSITY TEXTILE LAB - SINGLE-USE MICROFIBER FLAT MOPS

| Advantex | Mops | | | | Solution/ 1 g mop | Layer Compositions |
| --- | --- | --- | --- | --- | --- | --- |
| | Dry g | Wet g | Used g | Delivery g | | |
| Open Edge | 17.9 | 199.4 | 41.4 | 158.0 | 8.8 | Same as in Experiment 1 above |
| Sealed Side | 18.4 | 177.6 | 66.0 | 130.0 | 7.1 | |
| % Increase over sealed | | | | | 25.2% | |
| Com. C | | | | | | 1—Syn NW scrim w/stitched syn loops |
| Open Edge | 21.8 | 243.4 | 51.4 | 213.8 | 9.8 | 2—Separate Sponge Center |
| Sealed Side | 23.0 | 232.0 | 58.8 | 173.2 | 7.5 | 3—Syn NW scrim w/stitched syn loops |
| Percent Increase over sealed | | | | | 30.2% | |
| Com. D | | | | | | 1—Syn scrim |
| Open Edge | 21.0 | 259.4 | 53.6 | 205.8 | 9.8 | 2—Separate thin Sponge Center |
| Sealed Side | 23.4 | 254.4 | 69.4 | 185.0 | 7.9 | 3—Syn scrim |
| % Increase over Sealed | | | | | 24.1% | assy-stitched loops, stitchbonded edges |
| Com. E | | | | | | 1—Syn NW scrim |
| Open Edge | 13.4 | 141.2 | 31.8 | 109.4 | 8.1 | 2—Cellulose core |
| Sealed Side | 16.5 | 152.2 | 42.2 | 110.0 | 6.7 | 3—Syn NW scrim |
| % Increase over sealed | | | | | 21.9% | assy-stitched loops, stitchbonded edges |
| Com. F | | | | | | 1—Syn NW scrim |
| Open Edge | 21.3 | 195.4 | 61.2 | 134.2 | 6.3 | 2—Cellulose core |
| Sealed edge | 24.2 | 199.0 | 69.2 | 129.8 | 5.4 | 3—Syn NW scrim |
| % Increase over sealed | | | | | 17.9% | assy-stitched loops, stitchbonded edges |
| Com. G | | | | | | 1—Syn NW scrim |
| Open Edge | 22.0 | 195.4 | 55.0 | 140.4 | 6.4 | 2—Cellulose core |
| Sealed edge | 24.0 | 201.6 | 71.0 | 130.6 | 5.4 | 3—Syn NW scrim |
| % Increase over Sealed | | | | | 17.3% | assy-stitched loops, stitchbonded edges |

As in Experiment 1, every mop with an open edge performed about 17% to about 30% better than its as manufactured counterpart mop with a sealed edge.

Experiment 3

The same University also tested four commercial washable mops in the same way as described above for Experiment 2. The results are displayed in the same way in Table 3, below.

TABLE 3

UNIVERSITY TEXTILE LAB - WASHABLE MICROFIBER FLAT MOPS

| | Mops | | | | Solution/1 g mop | Layer Compositions |
| --- | --- | --- | --- | --- | --- | --- |
| | Dry g | Wet g | Used g | Delivery g | | |
| Com. H | | | | | | |
| Open edge | 42.4 | 483.6 | 80 | 403.6 | 9.5 | 1—knit microfiber cloth |
| Sealed edge | 48.6 | 504.4 | 131.4 | 373.0 | 7.7 | 2—Separate Sponge Center |
| % Increase over sealed | | | | | 24.0% | 3—Syn scrim w/stitch bonded syn loops |
| Com. I | | | | | | |
| Open edge | 72.1 | 498.8 | 156.2 | 342.6 | 4.8 | 1—knit microfiber cloth |
| Sealed edge | 85.6 | 514.2 | 218.6 | 295.6 | 3.5 | 2—Separate Sponge Center |
| % Increase over Sealed | | | | | 37.6% | 3—Syn scrim w/stitch bonded syn loops |
| Com. G | | | | | | |
| Open Edge | 56.4 | 397.4 | 126.0 | 271.4 | 4.8 | 1—knit microfiber cloth |
| Sealed edge | 64.6 | 407.2 | 157.0 | 250.2 | 3.9 | 2—Separate Sponge Center |
| % Increase over Serge | | | | | 24.2% | 3—Syn scrim w/stitch bonded syn loops |

TABLE 3-continued

UNIVERSITY TEXTILE LAB - WASHABLE MICROFIBER FLAT MOPS

| | Mops | | | | Solution/1 g | |
| --- | --- | --- | --- | --- | --- | --- |
| | Dry g | Wet g | Used g | Delivery g | mop | Layer Compositions |
| Com. K | | | | | | |
| Open Edge | 78.2 | 505.4 | 188.8 | 316.6 | 4.0 | 1—knit microfiber cloth |
| Sealed edge | 94.9 | 564.2 | 262.0 | 302.2 | 3.2 | 2—Separate Sponge Center |
| % Increase over Serge | | | | | 27.0% | 3—Syn scrim w/stitched syn loops |

These results demonstrate that open edge versions of the mops performed from about 24% to about 38% better than their "as manufactured" sealed edge counterparts.

CONCLUSION

Thus, we have surprisingly discovered that the cleaning solution absorbed and dispensed by a multi-layer pad type mop can be significantly enhanced by providing the pad with an unsealed edge, such that an absorbing and dispensing pathway extends from the interior of the mop to its perimeter edge. Of course, it will be appreciated that the above are preferred embodiments of the invention, and that the concept of the invention can be employed in other embodiments.

The invention claimed is:

1. A multi-layer mop pad comprising: a floor engaging layer of a thin, porous scrim, a thicker absorbent intermediate layer, and a cleaning tool engaging layer of thin porous scrim; said pad having an interior portion circumscribed by longitudinal side edges and lateral end edges, at least said side edges being open and unsealed, such that an absorbing and dispensing pathway extends from said interior portion of said mop pad to said open and unsealed side edges; said intermediate layer comprising a fluffy polypropylene or polyester fibrous absorptive fleece layer having a thickness of from about 0.10 to about 0.25 inches, and a density of 185 grams per square meter; each of said porous scrim layers having a thickness of about 0.010 inches or less, and being made of polyester or polypropylene.

2. The mop pad of claim 1 which includes a plurality of projecting loops which are stitched into said intermediate layer, through said floor engaging scrim layer, so as to project from said floor engaging scrim layer of the mop pad.

3. A multi-layer mop pad comprising: a floor engaging layer of a thin, porous scrim, a thicker absorbent intermediate layer, and a cleaning tool engaging layer of thin porous scrim; said pad having an interior portion circumscribed by longitudinal side edges and lateral end edges, at least said side edges being unsealed, such that an absorbing and dispensing pathway extends from said interior portion of said mop pad to said unsealed side edges; said intermediate layer comprising a fluffy polypropylene or polyester fibrous absorptive fleece layer having a thickness of from about 0.10 to about 0.25 inches, and a density of 185 grams per square meter; each of said porous scrim layers having a thickness of about 0.010 inches or less, and being made of polyester or polypropylene; said mop pad including a plurality of projecting loops which are stitched into said intermediate layer, through said floor engaging scrim layer, so as to project from said floor engaging scrim layer of the mop pad; said stitched loops being kept at about $\frac{1}{16}^{th}$ to about $\frac{3}{8}$ of an inch from said longitudinal side edges of said mop pad, allowing said absorbent intermediate layer to expand slightly beyond said loops in the direction of said longitudinal side edges, enhancing the absorptive and dispensing character said mop pad.

4. The mop pad of claim 3 in which said stitched loops have a denier ranging from less than about 1 to loops having a denier of about 5.

5. A multi-layer mop pad comprising: a floor engaging layer of a thin, porous scrim, a thicker absorbent intermediate layer, and a cleaning tool engaging layer of thin porous scrim; said mop pad having an interior portion circumscribed by longitudinal side edges and lateral end edges, at least said side edges being unsealed, such that an absorbing and dispensing pathway extends from said interior portion of said mop pad to said unsealed side edges; a plurality of projecting loops being stitched into said intermediate layer, through said floor engaging scrim layer, so as to project from said floor engaging scrim layer of said mop pad; said stitched loops being spaced about $\frac{1}{16}^{th}$ to about $\frac{3}{8}$ of an inch from said longitudinal side edges of said mop, allowing said absorbent intermediate layer to expand slightly beyond said loops in the direction of said longitudinal side edges, enhancing the absorptive and dispensing character said mop pad.

6. The mop pad of claim 5 in which said stitched loops have a denier ranging from less than about 1 to loops having a denier of about 5.

\* \* \* \* \*